United States Patent
Ranganath et al.

(10) Patent No.: US 9,679,309 B2
(45) Date of Patent: Jun. 13, 2017

(54) PLACEMENT ATTRIBUTE TARGETING

(71) Applicant: Google Inc., Mountain View, CA (US)

(72) Inventors: Rama Ranganath, San Francisco, CA (US); Deepak Jindal, Los Altos, CA (US); Ching Law, Sha Tin (CN); Gokul Rajaram, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/244,764

(22) Filed: Aug. 23, 2016

(65) Prior Publication Data

US 2016/0364751 A1    Dec. 15, 2016

Related U.S. Application Data

(63) Continuation of application No. 14/738,615, filed on Jun. 12, 2015, now Pat. No. 9,454,776, which is a continuation of application No. 11/854,420, filed on Sep. 12, 2007, now Pat. No. 9,058,608.

(51) Int. Cl.
| | |
|---|---|
| *G06F 3/00* | (2006.01) |
| *G06Q 30/02* | (2012.01) |
| *G06F 17/30* | (2006.01) |
| *G06F 17/00* | (2006.01) |
| *G06F 3/048* | (2013.01) |

(52) U.S. Cl.
CPC ..... *G06Q 30/0251* (2013.01); *G06F 17/3089* (2013.01); *G06Q 30/02* (2013.01); *G06Q 30/0277* (2013.01)

(58) Field of Classification Search
None
See application file for complete search history.

(56) References Cited

U.S. PATENT DOCUMENTS

| | | | |
|---|---|---|---|
| 5,724,521 A | 3/1998 | Dedrick | |
| 5,740,549 A | 4/1998 | Reilly et al. | |
| 5,848,397 A | 12/1998 | Marsh et al. | |
| 5,948,061 A | 9/1999 | Merriman | |
| 6,026,368 A | 2/2000 | Brown et al. | |
| 6,044,376 A | 3/2000 | Kurtzman, II | |
| 6,061,700 A | 5/2000 | Brobst et al. | |
| 6,078,914 A | 6/2000 | Redfern | |
| 6,144,944 A | 11/2000 | Kurtzman, II et al. | |
| 6,167,382 A | 12/2000 | Sparks et al. | |

(Continued)

FOREIGN PATENT DOCUMENTS

| | | |
|---|---|---|
| JP | 2002/183600 | 6/2002 |
| WO | 97/21183 | 6/1997 |
| WO | 2007/023321 | 3/2007 |

OTHER PUBLICATIONS

Abadie, Nathalie, Formalities Officer, European Patent Office, EP Patent Application No. 08799516.3, in Search Report, mailed Jul. 22, 2011, 4 pages.

(Continued)

*Primary Examiner* — Yongjia Pan
(74) *Attorney, Agent, or Firm* — Fish & Richardson P.C.

(57) ABSTRACT

A computer-implemented method, system, and computer-readable medium includes determining an attribute of a web page to be displayed to a user at a location, selecting content corresponding to the determined web page attribute, and transmitting the selected content to the location for display as at least part of the web page.

20 Claims, 4 Drawing Sheets

(56) References Cited

U.S. PATENT DOCUMENTS

| | | |
|---|---|---|
| 6,173,286 B1 | 1/2001 | Guttman et al. |
| 6,177,936 B1 | 1/2001 | Cragun |
| 6,268,856 B1 | 7/2001 | Bruck et al. |
| 6,269,361 B1 | 7/2001 | Davis et al. |
| 6,327,574 B1 | 12/2001 | Kramer et al. |
| 6,366,918 B1 | 4/2002 | Guttman et al. |
| 6,401,075 B1 | 6/2002 | Mason et al. |
| 6,519,616 B1 | 2/2003 | Zamora-McKelvy et al. |
| 6,587,127 B1 | 7/2003 | Leeke et al. |
| 6,591,271 B1 | 7/2003 | Ceri et al. |
| 6,629,097 B1 | 9/2003 | Keith |
| 6,687,734 B1 | 2/2004 | Sellink et al. |
| 6,704,776 B1 | 3/2004 | Fortune |
| 6,985,882 B1 | 1/2006 | Del Sesto |
| 6,990,653 B1 | 1/2006 | Burd et al. |
| 7,028,261 B2 | 4/2006 | Smyth et al. |
| 7,039,599 B2 | 5/2006 | Merriman |
| 7,136,875 B2 | 11/2006 | Anderson et al. |
| 7,203,838 B1 | 4/2007 | Glazer |
| 7,251,616 B1 | 7/2007 | Perttunen |
| 7,269,643 B2 | 9/2007 | Spaid |
| 7,409,402 B1 | 8/2008 | Chan et al. |
| 7,421,441 B1 | 9/2008 | Chan |
| 7,558,807 B2 | 7/2009 | Gonzalez |
| 7,599,931 B2* | 10/2009 | Shi .................. G06F 17/30864 |
| 7,752,072 B2 | 7/2010 | Barry et al. |
| 7,769,820 B1 | 8/2010 | Spies et al. |
| 7,783,622 B1 | 8/2010 | Vandermolen et al. |
| 7,856,601 B2 | 12/2010 | Moore et al. |
| 8,185,830 B2 | 5/2012 | Saha et al. |
| 9,058,608 B2 | 6/2015 | Ranganath et al. |
| 2001/0018340 A1 | 8/2001 | Tagi |
| 2002/0013725 A1 | 1/2002 | Takakura et al. |
| 2002/0026359 A1 | 2/2002 | Long et al. |
| 2002/0027570 A1 | 3/2002 | Muto et al. |
| 2002/0046099 A1 | 4/2002 | Frengut et al. |
| 2002/0103704 A1 | 8/2002 | Amano et al. |
| 2002/0111898 A1 | 8/2002 | Numaoka et al. |
| 2002/0120645 A1 | 8/2002 | Adapathya et al. |
| 2002/0123988 A1 | 9/2002 | Dean et al. |
| 2002/0161633 A1 | 10/2002 | Jacob et al. |
| 2002/0194062 A1 | 12/2002 | Linde |
| 2003/0063129 A1 | 4/2003 | Smyth et al. |
| 2003/0083937 A1 | 5/2003 | Hasegawa et al. |
| 2003/0149618 A1 | 8/2003 | Sender et al. |
| 2003/0172349 A1 | 9/2003 | Katayama et al. |
| 2004/0015397 A1 | 1/2004 | Barry et al. |
| 2004/0059708 A1 | 3/2004 | Dean et al. |
| 2004/0093327 A1 | 5/2004 | Anderson et al. |
| 2004/0122808 A1 | 6/2004 | Martin et al. |
| 2004/0139192 A1 | 7/2004 | Spaid |
| 2005/0108630 A1 | 5/2005 | Wasson et al. |
| 2005/0114430 A1 | 5/2005 | Zheng et al. |
| 2005/0149507 A1* | 7/2005 | Nye .................. G06F 17/30864 |
| 2005/0234953 A1 | 10/2005 | Zhang |
| 2005/0256850 A1 | 11/2005 | Ma |
| 2005/0273702 A1 | 12/2005 | Trabucco |
| 2005/0283833 A1 | 12/2005 | Lalonde et al. |
| 2006/0041754 A1 | 2/2006 | Hind |
| 2006/0069667 A1 | 3/2006 | Manasse et al. |
| 2006/0224662 A1 | 10/2006 | Richardson et al. |
| 2007/0027772 A1 | 2/2007 | Chou |
| 2007/0208740 A1 | 9/2007 | Nye |
| 2007/0260508 A1 | 11/2007 | Barry et al. |
| 2008/0072164 A1 | 3/2008 | Park |
| 2008/0155588 A1 | 6/2008 | Roberts et al. |
| 2008/0214162 A1 | 9/2008 | Ramer et al. |
| 2008/0262931 A1 | 10/2008 | Chan |
| 2008/0294497 A1 | 11/2008 | Simons |
| 2008/0300964 A1 | 12/2008 | Raghunandan |
| 2009/0044145 A1 | 2/2009 | Seo |
| 2009/0070706 A1 | 3/2009 | Ranganath et al. |
| 2010/0057559 A1* | 3/2010 | Wilf .................. G06F 17/30867 705/14.49 |
| 2010/0191600 A1 | 7/2010 | Sideman |
| 2013/0031582 A1 | 1/2013 | Tinsman et al. |
| 2015/0278885 A1 | 10/2015 | Ranganath et al. |

OTHER PUBLICATIONS

AdForce, Inc., A Complete Guide to AdForce, Version 2.6, 1998.
AdForce, Inc., S-1/A SEC Filing, May 6, 1999.
AdKnowledge Campaign Manager: Reviewer's Guide, AdKnowledge, Aug. 1998.
U.S. Appl. No. 95/001,061, Reexamination of Stone et al.
U.S. Appl. No. 95/001,068, Reexamination of Stone et al.
U.S. Appl. No. 95/001,069, Reexamination of Dean et al.
U.S. Appl. No. 95/001,073, Reexamination of Stone et al.
AdKnowledge Market Match Planner: Reviewer's Guide, AdKnowledge, May 1998.
Ad-Star.com website archive from www. Archive.org, Apr. 12, 1997 and Feb. 1, 1997.
Baseview Products, Inc., AdManagerPro Administration Manual v. 2.0, Dec. 1998.
Baseview Products, Inc., ClassManagerPro Administration Manual v. 1.0.5, Feb. 1, 1997.
Business Wire, "Global Network, Inc. Enters Into Agreement in Principle With Major Advertising Agency," Oct. 4, 1999.
Dedrick, R., A Consumption Model for Targeted Electronic Advertising, Intel Architecture Labs, IEEE, 1995.
Dedrick, R., Interactive Electronic Advertising, IEEE, 1994.
Hong, Kee Wan, Authorized Officer, Korean Intellectual Property, PCT Application No. PCT/US2008/076256, filed Sep. 12, 2008, in International Search Report mailed Mar. 23, 2009, 11 pages.
Information Access Technologies, Inc., Aaddzz brochure, "The Best Way To Buy And Sell Web Advertising Space," © 1997.
Information Access Technologies, Inc., Aaddzz.com website archive from www. Archive.org, archived on Jan. 30, 1998.
Request for Reexamination of U.S. Pat. No. 6,446,045 B1, Control No. 95/001,061.
Request for Reexamination of U.S. Pat. No. 6,829,587 B2, Control No. 95/001,068.
Request for Reexamination of U.S. Pat. No. 7,240,025 B2, Control No. 95/001,073.
Request for Reexamination of U.S. Pat. No. 7,249,059 B2, Control No. 95/001,069.
Zeff, R. et al., Advertising on the Internet, 2nd Ed., John Wiley & Sons, 1999.

* cited by examiner

PLACEMENT ATTRIBUTE TARGETING

CROSS-REFERENCE TO RELATED APPLICATIONS

This application is a continuation application of, and claims priority to, U.S. patent application Ser. No. 14/738,615, titled "Placement Attribute Targeting," filed on Jun. 12, 2015, which is a continuation application of U.S. patent application Ser. No. 11/854,420, now U.S. Pat. No. 9,058,608, titled "Placement Attribute Targeting," filed on Sep. 12, 2007. The disclosure of each of the foregoing applications is incorporated herein by reference.

TECHNICAL FIELD

This disclosure relates to presenting advertisements.

BACKGROUND

The popularity of the internet makes it an attractive medium for advertising. Advertising on the internet can include placing banner ads, which are rectangular boxes that include graphic components, on a page viewed by a user. When a user selects an advertisement, e.g., by clicking on it, embedded hypertext links direct the user to the advertiser's web site. An advertiser can request that advertisements related to the advertisers products and/or services be displayed on one or more web pages of one or more web sites. A publisher, e.g., a creator of a web site, can grant permission for advertisements to be displayed on web pages of their web site. The advertisements displayed on a web site can be tailored to meet the needs and interests of a user, which, in turn, can be determined based on factors including the content displayed on the web site, user information, and the like. When a user visits a web site, the first web page displayed to the user can be the home page of the web site, which, in turn, can be a login page. Subsequently, the user can navigate to other pages on the web site, e.g., by selecting hyperlinks that may be displayed on the home page. Each web page on a web site can be characterized by a page attribute, where the attribute is an indication of the type of the page. For example, the home page of a web site can have "homepage" as a page attribute.

SUMMARY

In one example, an advertiser can specify attributes of one or more web pages on which their advertisements can be displayed. If the attribute of a web page matches the attribute specified by the advertiser, then the advertiser's advertisement may be displayed on the web page. A publisher of a web site can request that advertisements be displayed on one or more web pages of their web site when a user accesses the web page. Based on the page attribute of the web page that the user accesses, one or more advertisements can be transmitted to the user for display, where the advertisements are chosen such that the page attribute matches the attribute specified by the advertiser.

In one aspect, a computer implemented method includes determining an attribute of a web page to be displayed to a user at a location, selecting content corresponding to the determined web page attribute, and transmitting the selected content to the location for display as at least part of the web page.

This, and other aspects, can include one or more of the following features. Based on the attribute, the web page can be one of a home page or a login page of a web site. The determining, selecting, and transmitting can be in response to receiving a request to display content from the user. The determining under the act determining the attribute of the web page can be based on an identifier pointing to a location of the web page. Determining the attribute of the web page can be based on web page content. Determining the attribute of the web page can be based on information provided by a publisher of the web page. The method can further include monitoring a number of requests to view the web page to establish a quality level for the web page. The method can further include receiving the content from a source. The source can specify corresponding attributes of web pages to which the content can be included. The method can further include displaying the web page with the selected content on a device at a network location. The content can include one or more advertisements.

In another aspect, a system comprising an engine is described. The system can include an attribute detection system configured to determine an attribute of a web page to be displayed to a user at a location, and a database configured to store content wherein the engine is configured to corresponding to the determined web page attribute, and transmit the selected content to the location for display as at least part of the web page.

This, and other aspects, can include one or more of the following features. Based on the attribute, the web page can be one of a home page or a login page of a web site. The engine can be configured to select and transmit in response to receiving a request to display content from the user. The attribute detection system can further be configured to determine the attribute of the web page based on an identifier pointing to a location of the web page. The attribute detection system can further be configured to determine the attribute of the web page based on web page content. The engine can further be configured to monitor a number of requests to view the web page to establish a quality level for the web page. The system can further include a sort of web pages to which the content can be included. The engine can further be configured to display the web page with the selected content on a device at a network location. The content can include one or more advertisements.

In another aspect, a system includes means for determining an attribute of a web page to be displayed to a user at a location, means for selecting content corresponding to the determined web page attribute, and means for transmitting the selected content to the location for display as at least part of the web page.

This, and other aspects, can include one or more of the following features. Based on the attribute, the web page can be one of a home page or a login page of a web site. The means for determining can further be configured to determine the attribute of the web page based on an identifier pointing to a location of the web page. The means for determining can further be configured to determine the attribute of the web page based on web page content. The means for determining can further be configured to determine the attribute of the web page based on information provided by a publisher of the web page. The system can further be configured to monitor a number of requests to view the web page to establish a quality level for the web page. The system can further be configured to receive the content from a source, wherein the source can specify corresponding attributes of web pages to which the content can be included. The system can further be configured to display the web page with the selected content on a device and a network location. The content can include one or more advertisements.

The systems and techniques described here can present one or more of the following advantages. Enabling an advertiser to place their advertisements on specific web pages on web sites can increase the impressions generated by the placement. Often, the first page that is viewed when a user visits a web site is the home page. On some occasions, the user is redirected to the home page while attempting to access other web pages on a web site. Thus, an advertisement placed on a home page is a high-profile placement that can be viewed by several users. Also, an advertiser can restrict a number of times an advertisement is displayed, thereby avoiding creating a negative impression on a user due to overexposure of their products and/or services. Publishers of web sites can be encouraged to improve the quality of content on all web pages on their web site to attract advertisers to place advertisements on all web pages and increase network traffic to their web site. In addition, a user can be presented with advertisements to products and/or services of interest while navigating through a web site without being overexposed to the same advertisement.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
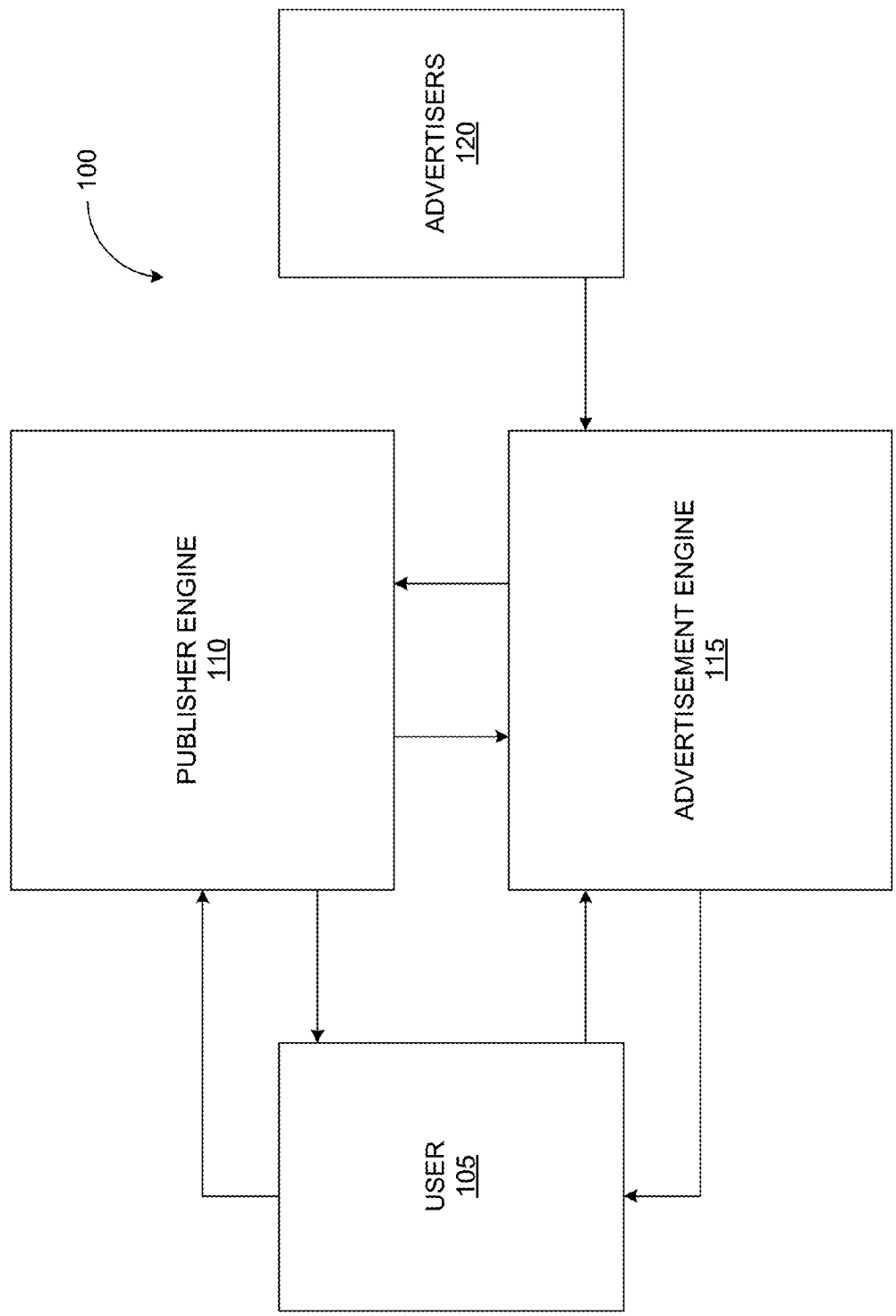
FIG. 1 is a schematic of an example of a system for placement attribute targeting.

FIG. 1 depicts a schematic of an example of a system 100 for presenting sponsored content (e.g., advertisements) to a user 105 based on the attributes of the display environment where the sponsored content is to be displayed (e.g., network locations that the user 105 is accessing). In some implementations, the system includes a publisher engine (PE) 110. In implementations where the network is the internet, the publisher can be the host of one or more web sites on the internet and the PE 110 can store one or more web pages corresponding to one or more web sites created or hosted by the publisher. The system 100 can include an advertisement engine (AE) 115 which can include a repository to store advertisements to be presented to the user 105 depending on one or more factors such as the content on the publisher's web site. The AE 115 can receive advertisements from one or more advertisers 120 connected to the AE 115. Though reference is made to advertisements, the system 100 can present other forms of content including other forms of sponsored content.

In some implementations, the user 105 can access the publisher's web site using a web browser, e.g., Internet Explorer. Upon receiving a request from a user 105, the PE 110 can present a web page, e.g., the home page of the web site, to the user 105. While the PE 110 can present the content of a web page to the user 105 on a display device, the AE 115 can present one or more advertisements, received from advertisers 120, to the user 105. In some implementations, the AE 115 can choose advertisements relevant to the content of the publisher's web page. Further, the AE 115 can receive instructions and/or requests from advertisers 120 to present advertisements on web pages that satisfy specific attributes, where the attribute can refer to a property of a web page. For example, the advertisers 120 may desire that advertisements be presented on home pages of web sites. The AE 115 can be configured to determine the attribute of a web page in the PE 110 that the user 105 has accessed for display. The AE 115 can further be configured to select advertisements that are not only relevant to the content of the web page but also satisfy advertisers' requests that their advertisements be presented only on web pages of certain attributes. The AE 115 can include advertisements that satisfy the advertisers' requests in the content displayed to the user 105.

Figure 2:
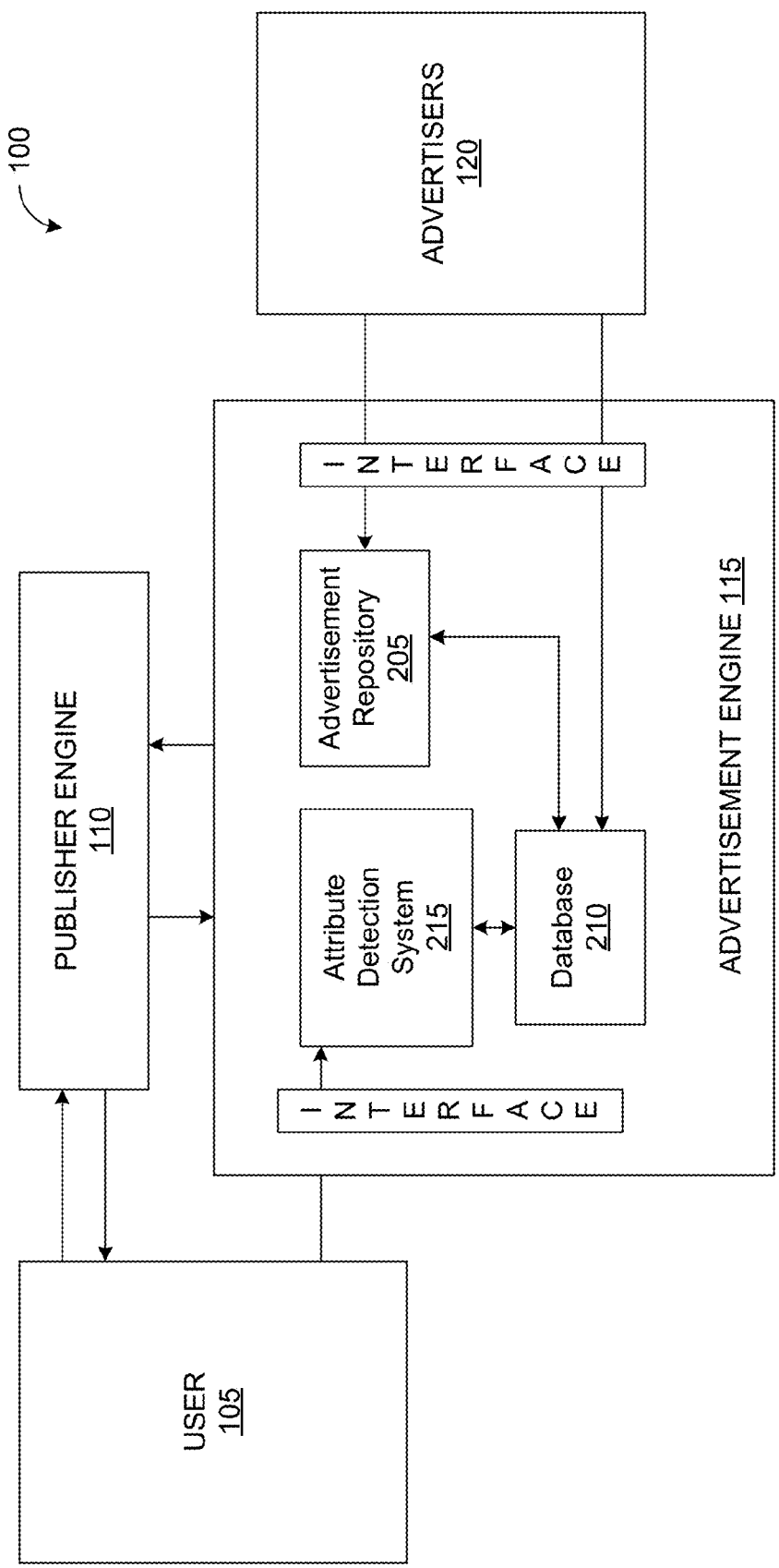
FIG. 2 is a schematic of an example of a system for presenting advertisements to users based on page attributes.

FIG. 2 is a schematic of an example of a system 100 for presenting advertisements to a user 105 based on the attribute of the web page that the user 105 accesses. In some implementations, the web pages of one or more web sites can be stored in the PE 110. A user 105 can access a web site by entering an identifier that points to the web site, e.g., a uniform resource locator (URL), in a web browser, e.g., Internet Explorer. In response, the PE 110 can transmit the content of the web page, to which the identifier points, to the user 105. For example, the user can be connected to the internet through a computer which includes a display device. The content of the web page can be transmitted to the display device.

In addition to the content of the web page, the publisher may wish to include advertisements relevant to the content of the web page. In such implementations, the PE 110 can request the AE 115 to include advertisements relevant to the content of the web pages of the web site. For example, the AE 115 can transmit code (e.g., a code snippet) to the PE 110 for inclusion in the content on one or more web pages of the web site transmitted to the user 105. When a user 105 accesses a web page including the transmitted code, the user's web browser can execute the transmitted code. The executed code can cause a message to be sent to the AE 115 that the user 105 has accessed a web page stored in the PE 110, and that the web page has requested the inclusion of advertisements.

Upon receiving the message, the AE 115 can retrieve an advertisement. The AE 115 can include an advertisement repository (AP) 205 which can be configured to store advertisements received from advertisers 120. The AE 115 can receive from the advertisers, advertisement related metadata in addition to the content to be presented as advertisements. The metadata can include information including key words that describe the advertisement, the type of content, e.g., text, audio, video, and the like, the size of the advertisement, e.g., in megabytes, the target audience, and the like. In addition, the metadata can include attributes of web pages on which the advertisers 120 would prefer that their advertisements be displayed. For example, advertisers 120 can specify that their advertisements be placed only on home pages of web sites. Alternatively, advertisers 120 can specify that their advertisements be placed on more than one web page on a web site, where each web page satisfies a certain attribute. In other examples, advertisers 120 can specify that their advertisements be displayed on all web pages that form a subset of the web site. For example, the web page presenting a request for advertisements can be www.sportsillustrated.com. The web page can include links, e.g., URLs, to several sports and leagues such as the National Football League (NFL), the National Basketball Association (NBA), and the like. All web pages containing information related to the NFL can share a common page attribute. Advertisers 120 may wish to advertise on all web pages that contain content relevant to the NFL, but not on the home page of the Sports Illustrated web site. To this end, advertisers can specify that their advertisements be displayed on all web pages of the Sports Illustrated web site that share the NFL page attribute. In this manner, advertisers 120 can specify attributes of web pages on which they require that their advertisements be displayed.

In some implementations, the AP 205 can be configured to not only store advertisements received from advertisers 120 but also to sort the stored advertisements based on the factors included in the metadata. In other implementations, the AE 115 can include a database 210 which can be configured such that the AP 205 stores the advertisements, as received from the advertisers 120, while the database 210 separates and sorts the advertisements according to the metadata, including the page attributes specified by the advertisers 120.

In some implementations, the AE 115 can include an attribute detection system (ADS) 215 configured to detect the attribute of a web page requesting an advertisement for display. For example, the attribute of a web page can be detected based on the identifier, e.g., the URL, of the web page. A URL of the web page can be www.examplewebpage.com/main.html. The ADS 215 can be configured to traverse the URL of the web page, identify the text "main" in the URL, and determine that the web page is a home page. In other examples, the ADS 215 can employ heuristics to determine the web page attribute. The following is an example of the heuristics employed to determine the attribute of a web page based on the URL.

---

IF the URL is at root-level (i.e., not of the form http://example.com/.../...)
    AND the URL ends in the form of
        "index[.ext]", "default[.ext]", "home[.ext]", "main[.ext]", or "homepage[.ext]",
            where [ext] is any file-extension including (but not limited to) ".html", ".htm", ".php", ".asp".
    THEN URL is a homepage url.

---

For example, "http://example.com/homepage.php" is a home page, but "http://example.com/ABC/index.html" is not a home page. In some implementations, page attributes can be determined based on the content of the pages.

Once the ADS 215 identifies the attributes of the web page requesting the advertisement, the AE 115 can retrieve one or more advertisements from the advertisement repository 205, where the retrieved advertisements are considered to be suitable for display since the determined attribute of the web page matches the page attribute specified by the advertisers providing the retrieved advertisements. The AE 115 can send the retrieved advertisements for display on the web page 105. In this manner, the content of the web page and advertisements relevant to the content and matching advertiser 120 specifications, can be transmitted to the user 105 from the PE 110 and the AE 115, respectively.

Figure 3:
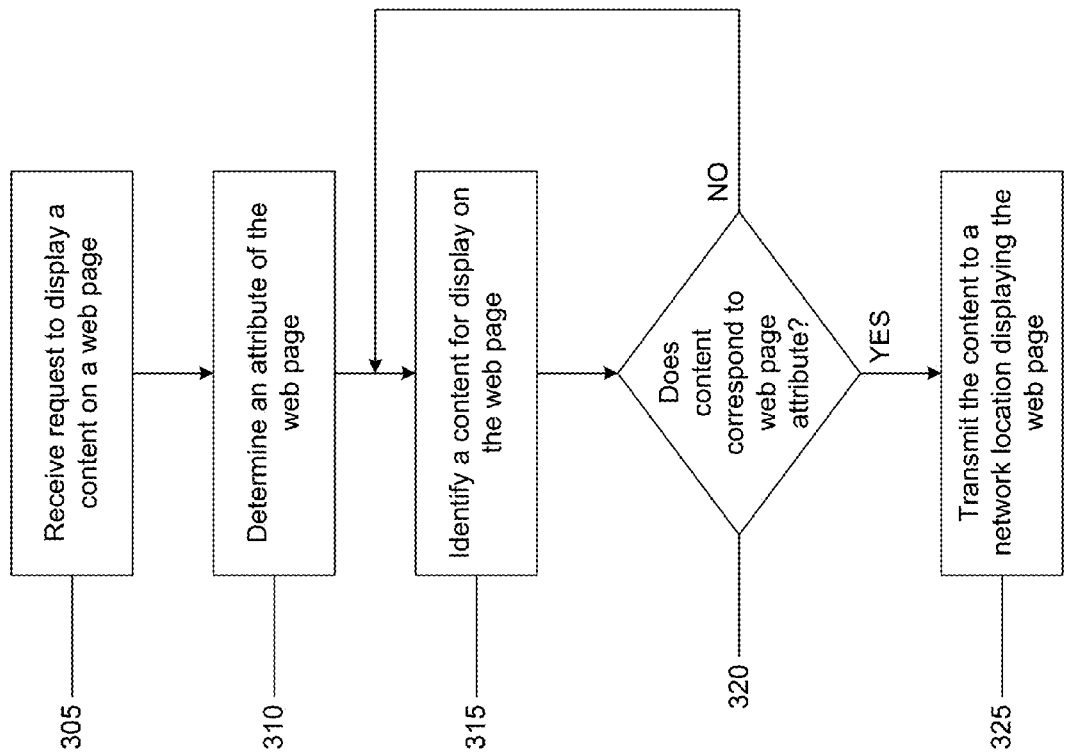
FIG. 3 is a flow chart of an example of a process for presenting advertisements based on page attributes.

FIG. 3 is a flow chart of an example of a process for displaying content on a page based on the page attribute. In some implementations, a request to display content on a web page can be received at 305 from a user. The user can be view the content and the web page on a display device that is part of a computer connected to a network, e.g., the internet. The web page can be part of a web site and the content can be an advertisement to be displayed on the web page in addition to the other content located on the web page. In some examples, the web page can be located on a server hosted by a publisher. The user can request the publisher to transmit the contents of the web page to the user. The web page can have embedded code which, when executed by the user's computer, causes a request to be sent to receive advertisements to be displayed on the web page. In other implementations, a publisher can send the request to transmit advertisements to the user when the user requests the publisher for a web page. For example, the user can enter a URL pointing to a web page in a web browser, e.g., Internet Explorer. The web page can be transmitted to the user in response to the request. The web page can include embedded code that can be executed by the user's web browser causing the request for advertisements to be transmitted.

An attribute of the web page can be determined at 310. In some implementations, the attribute can be determined based on an identifier, e.g., a URL that points to the web page. For example, the URL pointing to the web page can be www.example.com/home.html. By identifying the text "home" in the URL, it can be determined that the web page is a home page of a web site. Similarly, other attributes including login page, blog page, and the like can be determined based on the URL pointing to the web page. In other implementations, the attribute of the web page can be determined based on the contents of the web page. For example, the home page of a web site may contain text such as "Welcome," "Home," and the like. Similarly, a login page can include text such as "Login," "Password," and the like. The contents of the page can be traversed to identify the content and the page attribute can be determined based on the content identified. In other implementations, the attribute of a page can be provided by a publisher of the web page. In such implementations, when the publisher transmits a web page to a user, the publisher can also identify the attribute of the transmitted page. In such implementations, the attribute of the page can be verified by methods including traversing the web page to identify the web page contents, investigating a URL pointing to the web page, monitoring a number of visits to the web page, and the like. In this manner, a trust level can be established to ensure that the publisher does not misrepresent an attribute of a web page. In some implementations, page attributes can be determined based on the content of the pages.

In some implementations, a content for display on the web page can be identified at 315. For example, the content can be one or more advertisements that are available for display on web pages. The advertisements can be received from advertisers who, among other criteria, can specify pages on which they prefer/require that their advertisements be displayed. For example, advertisers can specify that their advertisements be displayed only on home pages of web sites. Alternatively, advertisers can specify that their advertisements be displayed on a subset of all web pages on a web site, where all pages of the subset share a common page attribute. In some examples, an advertiser can specify that their advertisements appear on all web pages of web sites sharing a common feature, e.g., home pages of all web sites in the English language, regardless of the content on the home pages.

In some implementations, the page attribute can be checked to ensure that the content corresponds to the web page attribute at 320. For example, the determined web page attribute can be compared with the attribute specified by an advertiser. If the page attribute matches the attribute specified by the advertiser, then the advertisement can be determined to be suitable for display on the web page. If not, then new advertisements can be searched. In some implementations, the advertisements received from the advertisers can be stored and sorted based on several factors, including page attributes. Upon determining a page attribute, the stored advertisements can be sorted by the identified attribute and subsequently advertisements suitable for display on the web page can be determined.

Upon identifying the content that is suitable for display on the web page, the content can be transmitted to a network location displaying the page at 325. In implementations where the network is the internet, the user can be connected to the network using a computer that includes a display device. The web page and the identified one or more advertisements can be transmitted to the user for display on the display device.

Figure 4:
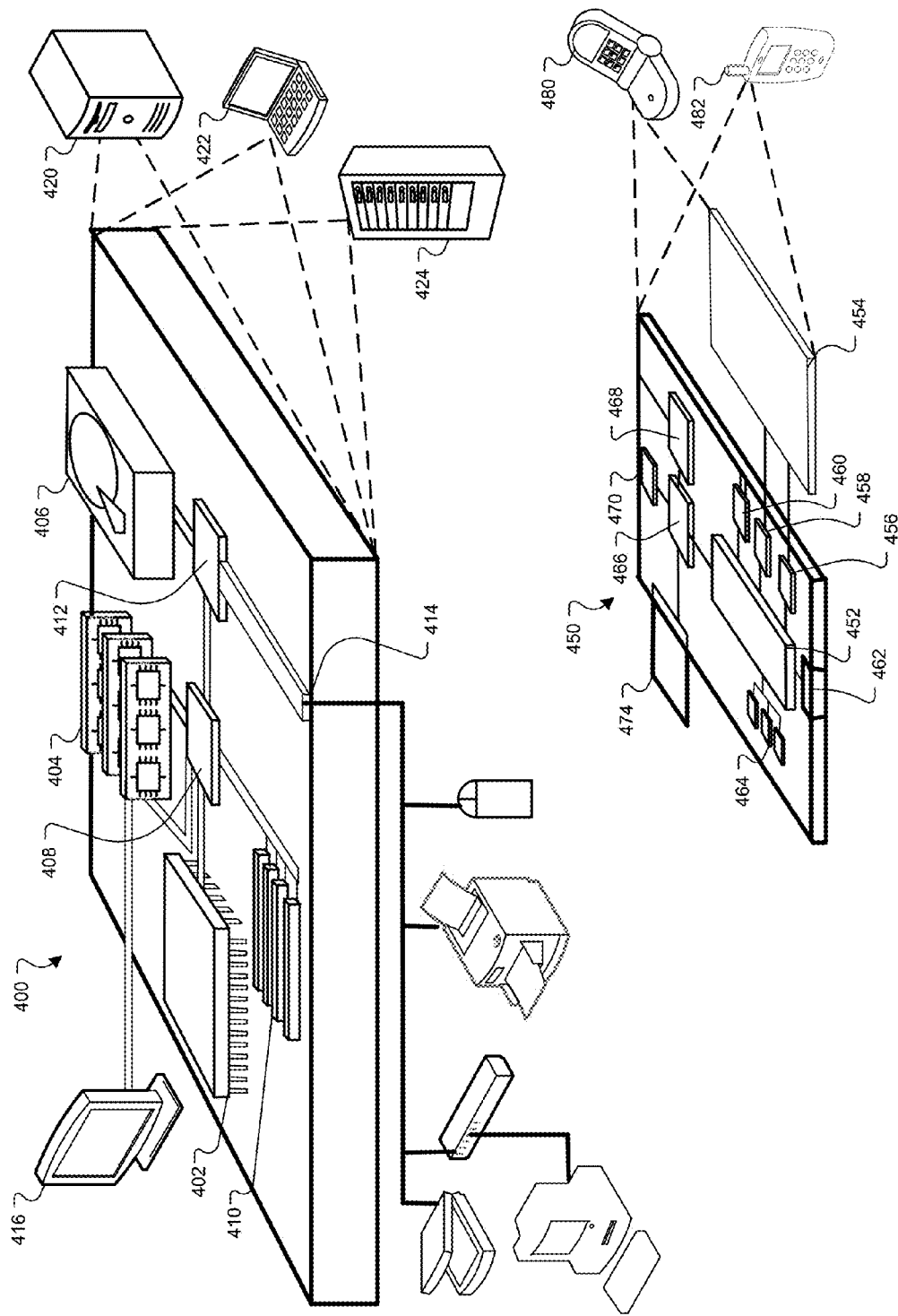
FIG. 4 is a block diagram of computing devices and systems.

FIG. 4 is a block diagram of computing devices and systems 400, 450. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, memory on processor 402, or a propagated signal.

The high speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 442, which may include, for example, a SIMM card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, memory on processor 452, or a propagated signal.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communication audibly using audio codec 460, which may receive spoken information from a user and convert it to usable digital information. Audio codex 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Where appropriate, the systems and the functional operations described in this specification can be implemented in digital electronic circuitry, or in computer software, firmware, or hardware, including the structural means disclosed in this specification and structural equivalents thereof, or in combinations of them. The techniques can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform the described functions by operating on input data and generating output. The processes and logic flows can also be performed by, and apparatus can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, aspects of the described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the disclosure. For example, in implementations where the network is the internet, the user can search for contents at one or more web pages on one or more web sites using a search engine, e.g., the Google search engine. In response to a search query entered in a text box of a web page, the Google search engine can retrieve content relevant to the search query and present the retrieved content to the user. A list of identifiers, e.g., URLs, pointing to each web page determined to contain content relevant to the search query, can be presented to the user. In addition to the list of identifiers, advertisements relevant to the search query can also be displayed. In some implementations, the attribute of the web page determined to contain relevant content can be determined, and advertisements suitable for display on the determined web page can be displayed along with the list of identifiers. In some implementations, the identifiers of web pages can be arranged based on a rank of the web pages, where the rank of the web page is an indication of the relevance of the content of the web page to the search query. Advertisers can specify that their advertisements be presented on pages that display identifiers of web pages of higher rank.

In some implementations, advertisers can specify page attribute as one of several factors based on which advertisements can be chosen for display. The page attribute may or may not be the first factor to consider when choosing an advertisement. In some implementations, content other than advertisements can be presented to a user based on the page attribute. For example, monitoring a web page can reveal that the publisher has misrepresented the attribute of the web page. In such implementations, messages that the identified page contains misrepresented information can be displayed to the user when the user clicks on a URL pointing to the misrepresented page. Such messages can be displayed prior to allowing a user to access the misrepresented page or in addition to displaying such a page, or both.

In some implementations, auctions can be conducted where advertisers can bid for presenting their advertisements on web pages of specific attributes, e.g., all home pages, web pages of web sites that share the same attribute, e.g., all pages on a web site that contain content related to a common theme, and the like. Revenue can be generated based on a cost per mille (CPM) basis, cost per click (CPC) basis, or combinations thereof. In some implementations, the advertisers can push all the advertisements to the AE 115 for storage in the AE 115. The AE 115 can store and sort the advertisements based on several factors including page attributes. In other implementations, upon determining a page attribute, the AE 115 can pull advertisements suitable for display from one or more advertisers 120. The AE 115 can transmit messages to the advertisers 120, in response to which, the advertisers 120 can transmit advertisements to the AE 115.

In some implementations, an advertiser can specify that their advertisements be presented on all web pages of a web site regardless of the page attribute, and, in addition, specify a number of displays. For example, the advertiser can specify displaying their advertisements 10 times beginning with the home page. Accordingly, other implementations are within the scope of the following claims.

What is claimed is:

1. A method, comprising:
    receiving, from a content provider, data specifying that a given portion of content provided by the content provider is to only be placed on a specified type of web page, including receiving data specifying that the given portion of content provided by the content provider is only to be placed on homepages of websites;
    receiving, from a client device, a request for content to be presented with a web page;
    determining, by one or more servers, a page type of the web page, including:
        analyzing a URL of the web page to determine whether the web page is a root-level web page;
        analyzing the URL of the web page to determine whether the URL ends with a homepage designation followed by a file extension; and
        determining that the page type of the web page is a homepage type when the analysis identifies the web page as a root-level web page and the URL ends with a homepage designation followed by a file extension; and
    distributing, to the client device, content for inclusion in the web page in response to the request, including distributing the given portion of content only when the page type of the web page is the homepage type.

2. The method of claim 1, wherein the homepage designation includes a text snippet of index, default, home, main, or homepage.

3. The method of claim 1, wherein the file extension includes one of the file extensions html, htm, php, or asp.

4. The method of claim 1, wherein the content includes one or more advertisements.

5. The method of claim 1, further comprising displaying the particular web page with the selected advertisement on a device at a network location.

6. The method of claim 1, wherein the homepage further includes a login page of a web site.

7. The method of claim 1, wherein determining the page type of the web page is in response to receiving the request for content to be presented with the web page.

8. A system comprising:
    one or more computers and one or more storage devices storing instructions that are operable, when executed by the one or more computers, to cause the one or more computers to perform operations comprising:
        receiving, from a content provider, data specifying that a given portion of content provided by the content provider is to only be placed on a specified type of web page, including receiving data specifying that the given portion of content provided by the content provider is only to be placed on homepages of websites;
        receiving, from a client device, a request for content to be presented with a web page;
        determining, by one or more servers, a page type of the web page, including:
            analyzing a URL of the web page to determine whether the web page is a root-level web page;

analyzing the URL of the web page to determine whether the URL ends with a homepage designation followed by a file extension; and determining that the page type of the web page is a homepage type when the analysis identifies the web page as a root-level web page and the URL ends with a homepage designation followed by a file extension; and distributing, to the client device, content for inclusion in the web page in response to the request, including distributing the given portion of content only when the page type of the web page is the homepage type.

9. The system of claim 8, wherein the homepage designation includes a text snippet of index, default, home, main, or homepage.

10. The system of claim 8, wherein the file extension includes one of the file extensions html, htm, php, or asp.

11. The system of claim 8, wherein the content includes one or more advertisements.

12. The system of claim 8, the operations further comprising displaying the particular web page with the selected advertisement on a device at a network location.

13. The system of claim 8, wherein the homepage further includes a login page of a web site.

14. The system of claim 8, wherein determining the page type of the web page is in response to receiving the request for content to be presented with the web page.

15. A non-transitory computer-readable medium storing software comprising instructions executable by one or more computers which, upon such execution, cause the one or more computers to perform operations comprising:

receiving, from a content provider, data specifying that a given portion of content provided by the content provider is to only be placed on a specified type of web page, including receiving data specifying that the given portion of content provided by the content provider is only to be placed on homepages of websites;

receiving, from a client device, a request for content to be presented with a web page;

determining, by one or more servers, a page type of the web page, including:

analyzing a URL of the web page to determine whether the web page is a root-level web page;

analyzing the URL of the web page to determine whether the URL ends with a homepage designation followed by a file extension; and determining that the page type of the web page is a homepage type when the analysis identifies the web page as a root-level web page and the URL ends with a homepage designation followed by a file extension; and distributing, to the client device, content for inclusion in the web page in response to the request, including distributing the given portion of content only when the page type of the web page is the homepage type.

16. The computer-readable medium of claim 15, wherein the homepage designation includes a text snippet of index, default, home, main, or homepage.

17. The computer-readable medium of claim 15, wherein the file extension includes one of the file extensions html, htm, php, or asp.

18. The computer-readable medium of claim 15, wherein the content includes one or more advertisements.

19. The computer-readable medium of claim 15, wherein the homepage further includes a login page of a website.

20. The computer-readable medium of claim 15, wherein determining the page type of the web page is in response to receiving the request for content to be presented with the web page.

* * * * *